US008069932B2

(12) United States Patent
Kamata

(10) Patent No.: US 8,069,932 B2
(45) Date of Patent: Dec. 6, 2011

(54) METHOD AND APPARATUS FOR DETERMINING FORMATION PARARMETERS USING A SEISMIC TOOL ARRAY

(75) Inventor: Masahiro Kamata, Kawasaki (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 296 days.

(21) Appl. No.: 12/324,765

(22) Filed: Nov. 26, 2008

(65) Prior Publication Data

US 2009/0143990 A1   Jun. 4, 2009

Related U.S. Application Data

(60) Provisional application No. 60/991,216, filed on Nov. 29, 2007.

(51) Int. Cl.
*E21B 47/00*   (2006.01)
(52) U.S. Cl. ............................................ 175/50; 175/40
(58) Field of Classification Search .................... 175/40, 175/50
See application file for complete search history.

(56) References Cited

U.S. PATENT DOCUMENTS

| 4,953,137 | A | 8/1990 | Medlin |
| 6,308,137 | B1 | 10/2001 | Underhill et al. |
| 6,400,646 | B1 | 6/2002 | Shah et al. |
| 7,040,415 | B2 * | 5/2006 | Boyle et al. ................... 175/40 |
| 7,180,825 | B2 | 2/2007 | Shah |
| 2005/0279532 | A1 | 12/2005 | Ballantyne et al. |
| 2006/0062082 | A1 | 3/2006 | Mandal |
| 2007/0153631 | A1 | 7/2007 | Menard |
| 2007/0156359 | A1 | 7/2007 | Varsamis et al. |

FOREIGN PATENT DOCUMENTS

WO    WO 00/13043 A1    3/2000

OTHER PUBLICATIONS

P. Breton et al., "Well Positioned Seismic Measurements," Oilfield Review, pp. 32-45, Spring, 2002.

* cited by examiner

*Primary Examiner* — Giovanna Wright
(74) *Attorney, Agent, or Firm* — Daryl R. Wright; Brigitte Jeffery Echols; Jeff Griffin

(57) ABSTRACT

A method and apparatus for determining formation parameters including a seismic array for receiving seismic waves at plurality of depth simultaneously, thereby enabling a determination of a formation velocity by using a difference in the seismic waves received by the various portions of the array.

20 Claims, 16 Drawing Sheets

CHECKSHOT A

CHECKSHOT B

METHOD AND APPARATUS FOR DETERMINING FORMATION PARARMETERS USING A SEISMIC TOOL ARRAY

CROSS REFERENCE TO RELATED APPLICATIONS

This application is a non-provisional application of U.S. Provisional Patent Application 60/991,216, filed 29 Nov. 2007, the content of which is incorporated herein by reference for all purposes.

BACKGROUND OF THE DISCLOSURE

1. Field of the Invention

The present disclosure relates to techniques for acquiring downhole seismic data of a formation, and, more particularly, to techniques using a multi-level seismic tool to acquire seismic data simultaneously at multiple location or depths.

2. Background of the Related Art

Existing Borehole Seismic While Drilling tools contain seismic receivers with a highly accurate downhole clock. The seismic sensors are disposed in a drill collar to record borehole seismic data while drilling ceases, as shown in FIG. 1. The tool digitizes the received seismic signals or waves and puts the data into a circular buffer. In other words, as the tool is drilling seismic data is typically buffered in an on-going basis keeping only the most recent acquisitions. As soon as the tool recognizes the first break/indication of a desired seismic signal or cessation of drilling, the tool acquires data from a specified time before the first break or cessation in a predefined time window. Thus, the tool is able to record a seismic signal that was received during a period of time that is deemed to be the time window in which the relevant data should appear. The tool then stores the data with a time stamp based on the high precision clock. The tool then transmits the first break time, and possibly some data (possibly after data compression), to the surface by using a MWD telemetry system. Using the downhole first break time and the surface reference time, the travel time for seismic energy between the surface and downhole may then be computed.

Since seismic data cannot be acquired while drilling because of high noise, acquisition is performed each time drilling ceases. For example, when adding a new stand, which is typically three joints of a drill pipe. The typical length of a drill pipe joint is about 10 m and the length of a stand is therefore typically 30 m. This means that the seismic data is acquired at every 30 m. In contrast, conventional wireline borehole seismic measurements are acquired at 15 m intervals to optimize spatial aliasing in Vertical Seismic Profiling data. Therefore, in order to obtain the benefits of the 15 m intervals using conventional single level or single module while drilling seismic tool, the drilling has to be stopped in the middle of running the stand, just to take the measurement. Such an operation is not preferred because of rig time is expensive and additional downtime or non-drilling time is costly.

A further limitation of the current Borehole Seismic While Drilling tools is the clock drift that occurs when the tool has been drilling for an extended period of time. In other words, once a tool has been drilling for several days (three or more for example), the downhole clock becomes desynchronized from the uphole or reference clock, the difference in the synchronization being the drift. This drift then causes inaccuracies in the interpretation of the received data. Currently, in order to compensate or eliminate the drift, the tool is brought back to where a previous checkshot was completed when the clocks were still synchronized, so that the clocks can be recalibrated or resynchronized. Since the drill pipe has to be pulled up, or possibly some joints of the drill pipe have to be removed at the surface to lift the tool to the depth where the previous checkshot was performed, the clock calibration requires rig downtime which, again, is expensive.

SUMMARY OF THE DISCLOSURE

According to one exemplary embodiment, an apparatus including a drill string, a drill bit and first and second seismic modules having seismic sensors for receiving seismic waves is disclosed. The drill string comprises at least a first and a second section of drill pipe, with the drill bit being disposed at a distal end thereof. The first seismic module is disposed near the distal end of the drill string, between the drill bit and the first section of drill pipes, and the second seismic module is disposed between the first and the second section of drill pipe.

According to another exemplary embodiment, a method of obtaining formation parameters using a seismic tool array is disclosed. The method includes receiving seismic waves with a plurality of seismic modules, wherein a first and a second of the plurality of modules are disposed on a drill string and are separated by at least one section of drill pipe; and determining a parameter of the formation by using the seismic wave information received by the first and the second modules.

According to another exemplary embodiment, a method of obtaining formation parameters using a seismic tool array is disclosed. The method includes providing a seismic tool array having a least a reference clock and a downhole clock; propagating a first set of seismic waves into a subterranean formation at a first time, wherein the clocks are synchronized; receiving the first set of seismic waves with a plurality of seismic modules, wherein a first and a second of the plurality of modules are disposed on a drill string and are separated by at least one section of drill pipe; propagating a second set of seismic waves into the subterranean formation at a second time, wherein the clocks are desynchronized; receiving the second set of seismic waves with the plurality of seismic modules; and determining a velocity of the formation by using a difference in the seismic waves received by the first and the second tool at the first and second times.

According to yet another exemplary embodiment, an apparatus for determining formation parameters using a plurality of modules is disclosed. The apparatus includes a drill string that includes a first section of wired drill pipe and a second section of non-wired drill pipe, having a drill bit disposed at a distal end thereof. The apparatus further includes a first module disposed near the distal end of the drill string, between the drill bit and the first section of drill pipe, and a second module disposed between the first and the second section of drill pipe, wherein the modules include sensors for receiving one of a formation and borehole parameter.

DESCRIPTION OF THE DRAWINGS

The accompanying drawings illustrate certain embodiments and are a part of the specification. Together with the following description, the drawings demonstrate and explain some of the principles of the present disclosure.

Figure 1:
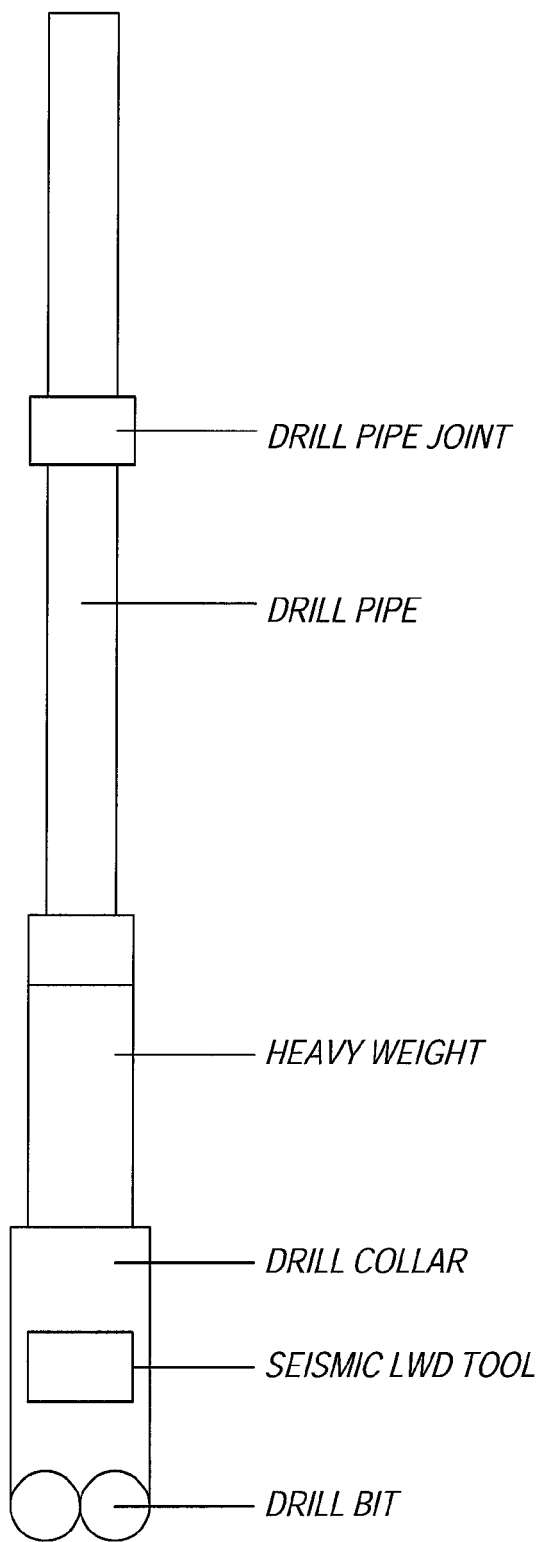
FIG. 1 is a schematic side view of a while-drilling tool with drill pipe.

Throughout the drawings, identical reference numbers and descriptions indicate similar, but not necessarily identical elements. While the principles described herein are susceptible to various modifications and alternative forms, specific embodiments have been shown by way of example in the drawings and will be described in detail herein. However, it should be understood that the disclosure is not intended to be limited to the particular forms disclosed. Rather, the disclosure includes all modifications, equivalents and alternatives falling within the scope of the appended claims.

DETAILED DESCRIPTION

So that the above recited features and advantages of the present disclosure can be understood in detail, a more particular description of the invention, briefly summarized above, may be had by reference to the embodiments thereof that are illustrated in the accompanied drawings. It is to be noted, however, that the drawings illustrate only typical embodiments of this invention and are therefore not to be considered limiting of its scope, for the invention may admit to other equally effective embodiments.

Figure 2:
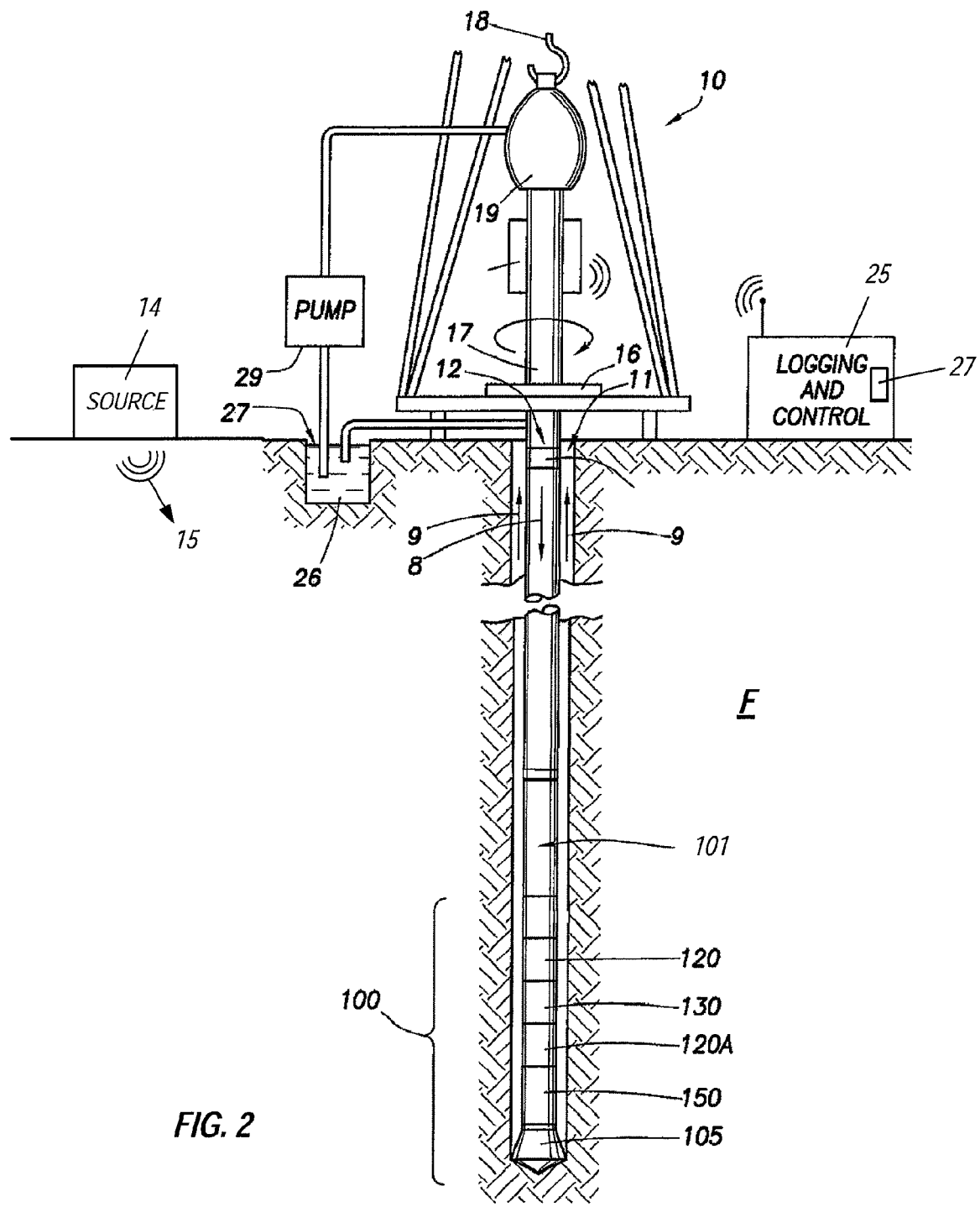
FIG. 2 is a schematic side view of a drilling rig and partial while-drilling tool disposed in a wellbore.

FIG. 2 illustrates a wellsite system in which the present invention can be employed. The wellsite can be onshore or offshore. In this exemplary system, a borehole 11 is formed in subsurface formations by rotary drilling in a manner that is well known. Embodiments of the invention can also use directional drilling or drilling with a mud motor, as will be described hereinafter.

A drill string 12, that includes a plurality of drill pipes 101, is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used. The wellsite system also includes a control unit 25 communicably coupled to a tool or source 14, as it may be, has a reference or surface clock 27 for, among other things, tracking and logging the times at which the source(s) 14 are activated.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation. For generating and propagating a seismic signal 15, such as seismic waves, the surface system also includes a seismic source 14, that may be an air gun, vibrator, dynamite, or other sources know in the art. The present disclosure may also be used with passive sources, such as natural fracturing and induces acoustic signals.

The bottom hole assembly 100 of the illustrated embodiment may includes a logging-while-drilling (LWD) module 120, a measuring-while-drilling (MWD) module 130, a roto-steerable system and motor 150, and drill bit 105.

The LWD module 120 is housed in a special type of drill collar, as is known in the art, and can contain one or a plurality of known types of logging tools, such as a seismic tool. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes a seismic measuring device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module may includes one or more of the following types of measuring devices: a weight-on-bit measuring device, a torque measuring device, a vibration measuring device, a shock measuring device, a stick slip measuring device, a direction measuring device, and an inclination measuring device.

Figure 3:
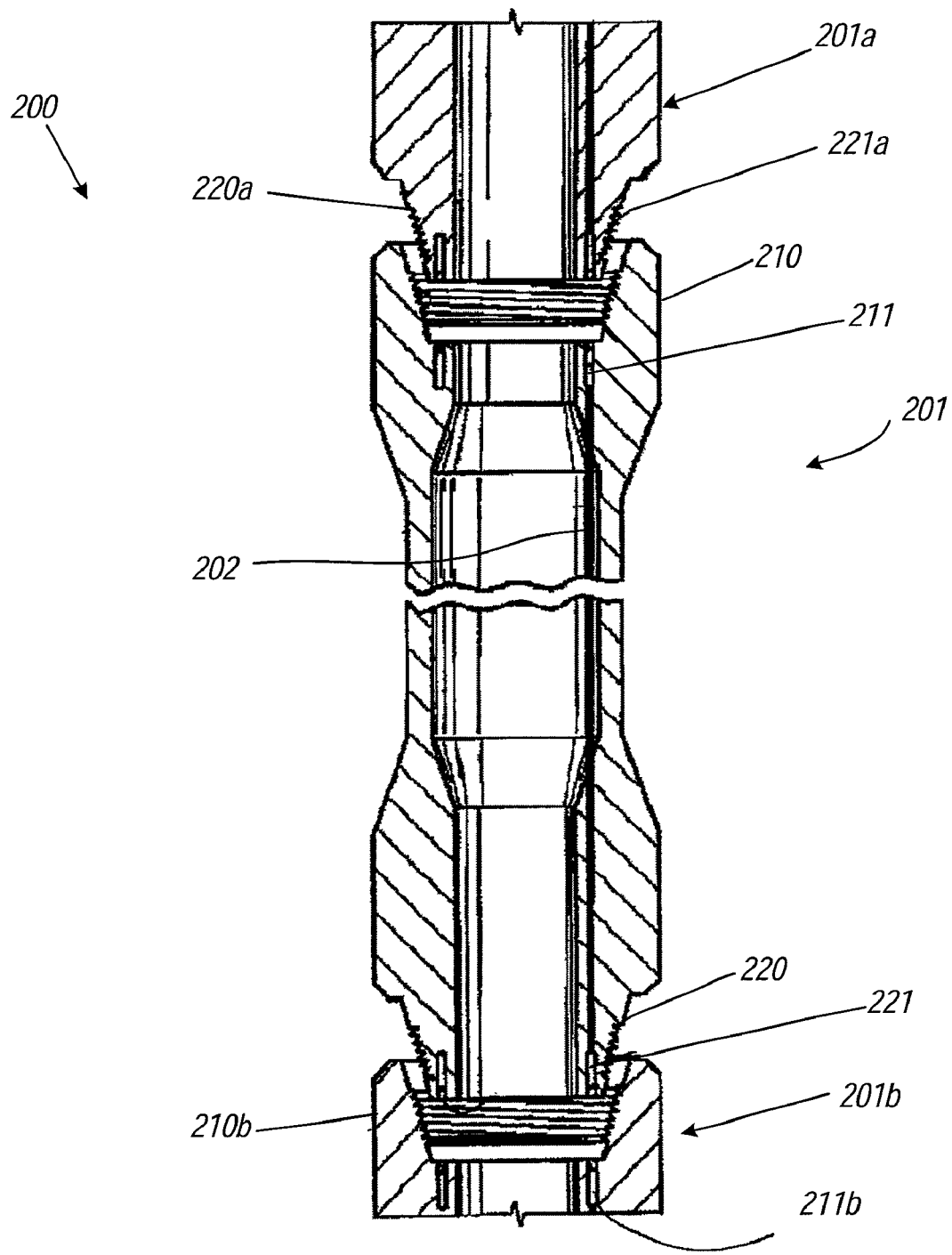
FIG. 3 is a cross-sectional view of an exemplary wired drill pipe that may be used in one embodiment of the disclosure.

In an alternate embodiment, the BHA may be connected to the surface with wired-drill-pipe (WDP) as is illustrated in FIG. 3. More specifically, reliably conveying data and/or power along a drill string has become an increasingly important aspect of wellbore drilling operations. In particular, oil companies have become increasingly reliant on the use of real-time downhole information, particularly information related to the conditions associated with the drill bit 105, the BHA 100, and a formation F, to improve the efficiency and accuracy of their drilling operations.

Numerous types of telemetry systems are commonly used in connection with MWD and LWD systems. For example, mud-pulse or mud siren telemetry systems use modulated acoustic waves in the drilling fluid to convey data or information between the BHA 100 and the surface equipment. However, mud-pulse telemetry systems have a relatively low data transmission rate of about 0.5-12 bits/second and, thus, substantially limit the amount of information that can be conveyed in real-time and, as a result, limit the ability of an oil company to optimize their drilling operations in real-time.

In contrast to mud-pulse, a wired drill pipe system can convey data at a relatively high rate along the length of a drill string. One example of a wired drill pipe system 200 is shown in FIG. 3, which shows three interconnected pipe sections 201, 201*a*, 201*b*. The upper pipe section 201*a* is connected to the center pipe section 201 by mating the pin end 220*a* of the upper section 201*a* with the box end 210 of the center pipe section 201. Likewise, the center pipe section 201 is connected with the lower pipe section 201*b* by mating the pin section 220 of the center pipe section 201 with the box end 210*b* of the lower pipe section 201*b*. In this manner, an entire drill string may be created by mating adjacent sections of pipe.

The center section 201 includes a communicative coupler 211 in the box end 210 of the pipe section 201. When the upper pipe section 201*a* and the center pipe section 201 are connected, the communicative coupler 211 in the center pipe section is located proximate a communicative coupler 221*a* in the box end 220*a* of the upper pipe section 201*a*. Likewise, a communicative coupler 221 in the pin end 220 of the center pipe section 201 may be proximate a communicative coupler 211*b* in the box end 210*b* of the lower pipe section 201*b*.

A wire 202 in the center pipe section 201 spans the length of the pipe section 201 and is connected to each communication coupler 211, 221. Thus, data and/or power that is transferred to a pipe section from an adjacent pipe section may be transferred through the wire to the communicative coupler at the opposing end of the pipe section, where it may then be transferred to the next adjacent pipe section.

The communicative coupler may be any type of coupler that enables the transfer of data and/or power between pipe sections. Such couplers include direct or galvanic contacts, inductive couplers, current couplers, and optical couplers, among others.

Figure 4:
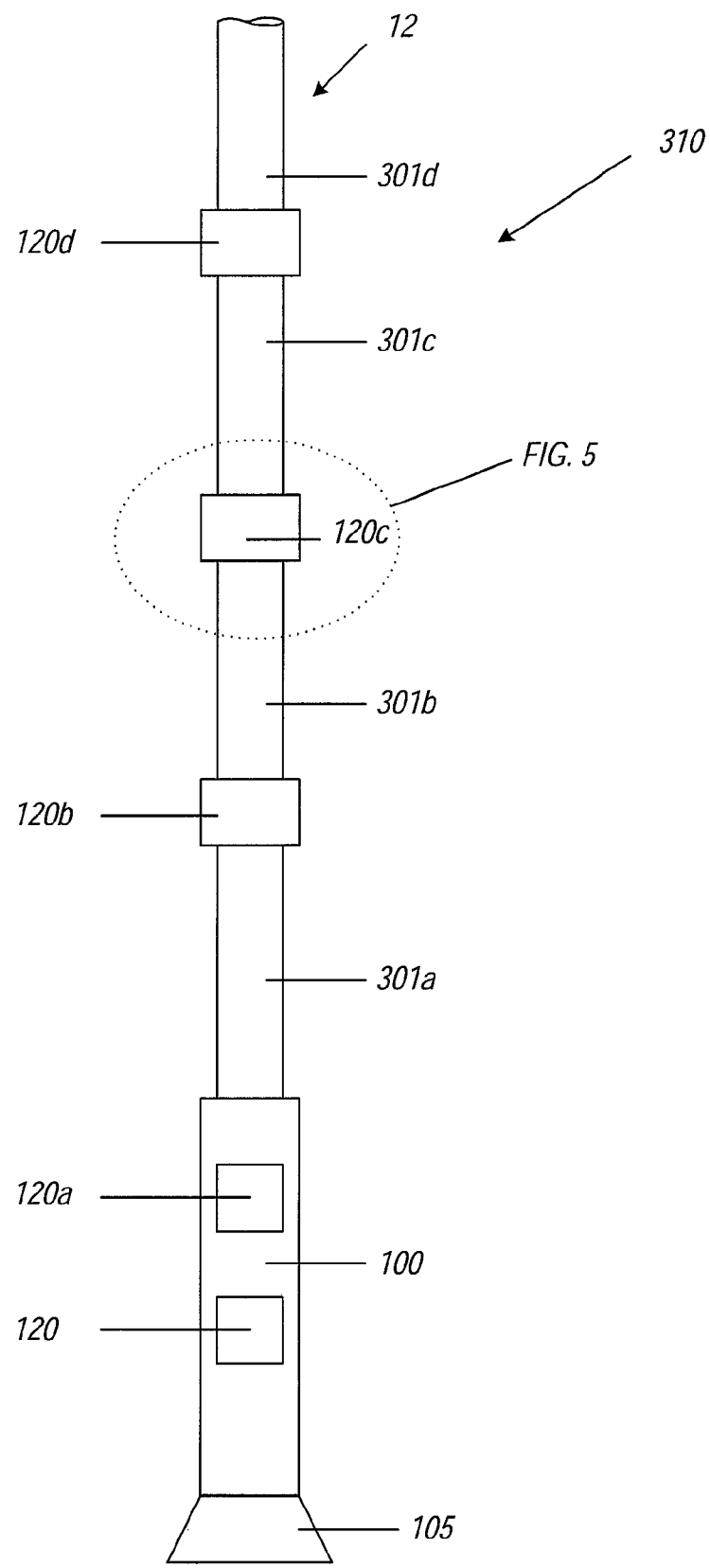
FIG. 4 is a schematic side view a downhole seismic array of the present disclosure.

Regardless of the types of drill pipe that is used, be it WDP as is shown in FIG. 3 or regular drill pipe as is illustrated in FIG. 2, the presently disclosed seismic array 310 may include at least one seismic module in the BRA 100 (BHA module), such as the module 120 and/or 120*a* for example, and one or more additional seismic modules (in-pipe modules) 120*b*, 120*c* . . . 120*n* disposed in the drill string 12 as is illustrated in FIG. 4. The in-pipe modules be may be separated by a section of drill pipe 301 that includes only one drill pipe section that is approximately 10 meters long, or may be separated by a section of drill pipe 301 that includes a plurality of drill pipes, such as a stand that is approximately 30 meters long.

Figure 5:
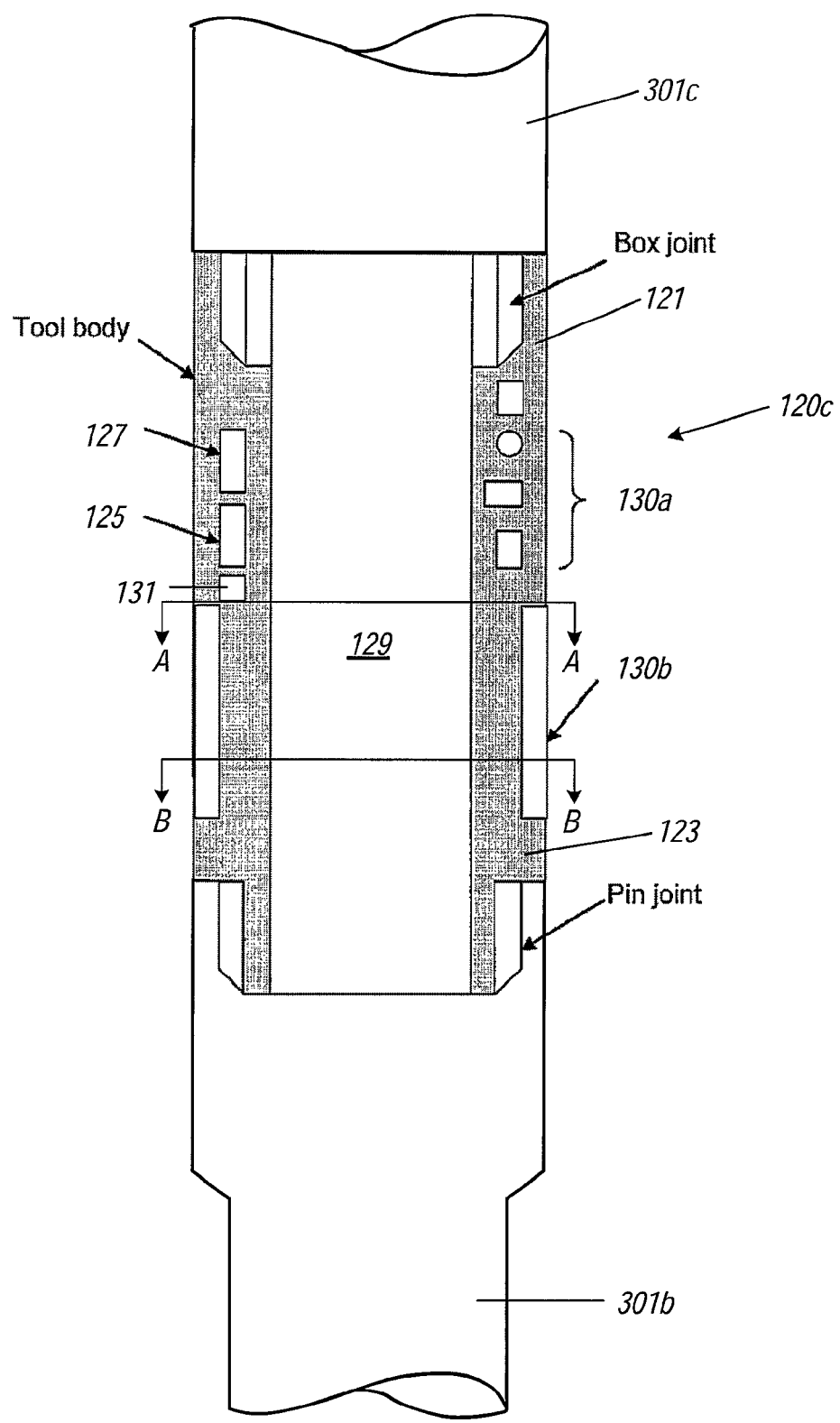
FIG. 5 is a cross-sectional side view of one exemplary embodiment of a seismic module of the downhole seismic array of FIG. 4.

The in-pipe module 120*c*, as illustrated in FIG. 5, includes an upper end 121 having a box joint connection for connecting to the pipe section 301*c* and a lower end 123 having a pin joint connection for connecting to the pipe section 301*b*. Other methods or means of connecting drill pipe known in the art may be utilized for connecting the in-pipe modules to the drill pipe 301 and is, therefore, contemplated herein as well As shown in the cross-sectional view of the in-pipe module of FIG. 5, the modules may include a plurality of seismic sensors 130, such as geophones 130*a* and a hydrophone 130*b*. The geophones may be grouped in a set of three, wherein one is oriented vertically and the other two are oriented horizontally relative to the direction of the tool. The hydrophone 130*b* may be mounted around the modules 120 to be exposed to a fluid pressure in the annulus or borehole. Electronics 125 and a power source 127 may be packaged inside the modules 120. The power source 127 may include a battery, a turbine, other power generating device, and/or may receive power through a WDP system. A clock 131 is also disposed in at least one of the modules (BHA and/or in-pipe) that is communicably coupled to the sensors 130 and electronics 125 for tracking and logging the times at which the seismic signals are received. When using WDP, the seismic data may be sent via the WDP infrastructure to the BHA for processing. However, other methods for communicating the seismic data to the BHA, or for permitting communication between the modules 120, may be accomplished by electromagnetic, acoustic or mud pulse telemetry, or any other telemetry means know to those of skill in the art. Disposed in the center of the modules 120 is a passageway 129 to facilitate the flow of mud from the surface of to the drill bit 105.

Figure 6:
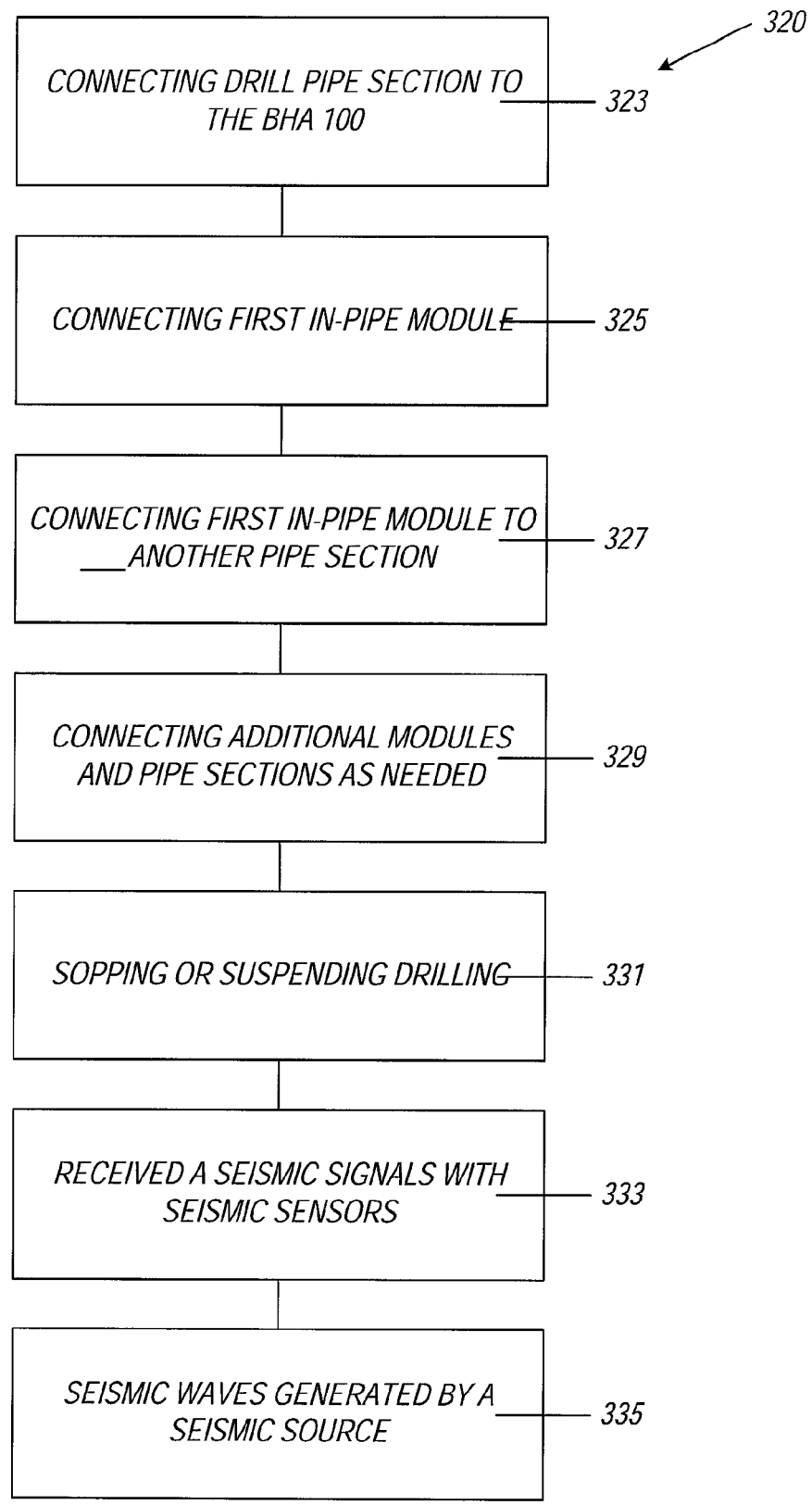
FIG. 6 is a flowchart of one exemplary drilling operation.

In one exemplary operation 320, as is illustrated in FIG. 6 (and with reference to FIG. 2), the drilling process begins with the lowering of the BHA 100 into the wellbore 11. Once the BHA 100 is lowered, a first drill pipe section 301 may be connected to the BHA 100 (323). As noted earlier, typically the length of a single drill pipe is about 10 m and the length of a stand (e.g. three drill pipes connected) is 30 m. Thus the operation, depending on the need of the spacing of the modules 120, may see drill pipe sections 301 having various lengths separating the in-pipe modules 120. Once the desired length of drill pipe has been added to the BHA 100, the first in-pipe module 120*b* may be connected to the pipe section 301*a* (325). The first in-pipe module 120*b* would then be connected to the second pipe section 301*b* (327), followed by more in-pipe modules 120 and pipe sections 301 as needed (329). As is know to those with skill in the art, as the drill string 12 is being created, drilling may occur by rotation of the drill string 12. During drilling various times throughout the drilling process, the drilling may be temporally stopped or suspended (331) to acquire seismic signal data with the modules 120. The seismic data will be received by the seismic sensors 130 (333), from seismic waves 15 generated by the seismic source 14 (335). Using this or a similar basic drilling process, various types of seismic measurements or measurement processes can be accomplished, some of which are described below.

Figure 7A:
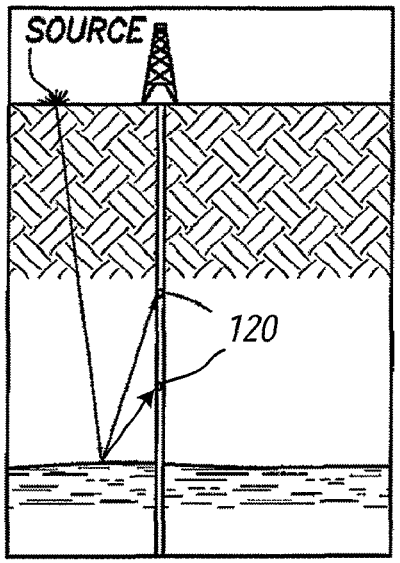
FIGS. 7A-8B are side views of various types of exemplary seismic measurement techniques usable with the present disclosure.
Figure 7B:
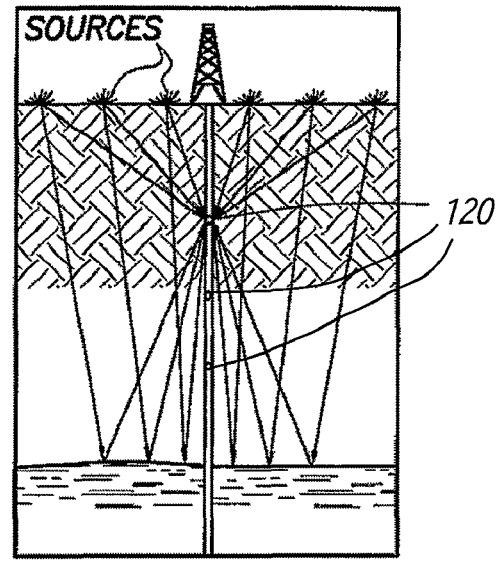
Figure 8A:
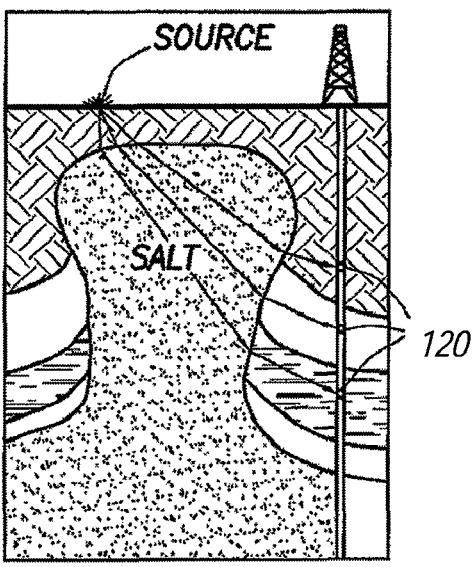
Figure 8B:
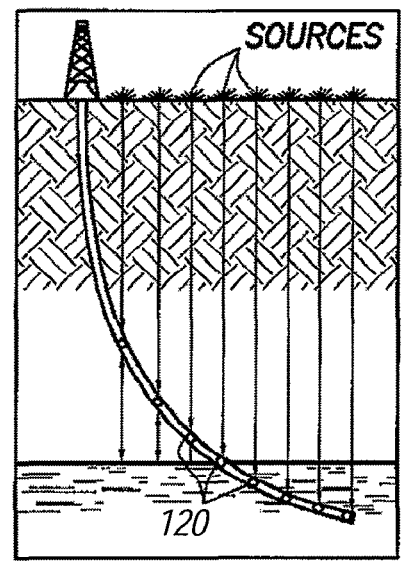

For example, FIG. 4 illustrates a seismic array 310 which can be used as a part of an LWD tool suite disclosed in P. Breton et al., "Well Positioned Seismic Measurements," Oilfield Review, pp. 32-45, Spring, 2002, incorporated herein by reference. The seismic array 310 has a plurality of receivers/modules 120, as depicted in FIGS. 7A-8B, and can be employed in conjunction with a single seismic source at the surface (as depicted in FIGS. 7A and 8A) or a plurality of seismic sources at the surface (as depicted in FIGS. 7B and 8B). Accordingly, FIG. 7A, which includes reflection off a bed boundary, and is called a "zero-offset" vertical seismic profile arrangement; FIG. 7B, which includes reflections off a bed boundary, and is called a "walkaway" vertical seismic profile arrangement (although multiple lines to all receivers are not shown for clarity); FIG. 8A, which includes refraction through salt dome boundaries, and is called a "salt proximity" vertical seismic profile; and FIG. 8B, which includes some reflections off a bed boundary, and is called a "walk above" vertical seismic profile.

The present techniques may be used with the above and other measurement processes to obtain seismic related formation parameters. Specifically, with an array of in-pipe modules 120 or sensors 130 as described in FIGS. 4 and 5, many levels of seismic sensors 130 or in-pipe modules 120 can be deployed in a drill-string with a large or desired spacing.

Motion Attenuation

As the drill string 12 obtains its length, the drill string 12, and hence the modules 120, may encounter undesired noise. Specifically, for a long cylindrical body (such as the drill-string 12) the dominant modes acting on the body may be a tortional mode and a bending mode. However, tortional and bending modes are not present in the pure plane wave propagation of seismic energy and can be considered as noise. This means that if the tortional and bending modes acting on the string 12 can be isolated and removed from the received seismic signal, then a more accurate or noise-less signal can be achieved. To accomplish this, the geophones 130a can be arranged in the annulus of the tool or module 120 to measure tensor components of seismic waves and undesired noise, as shown in FIG. 9.

Figure 9:
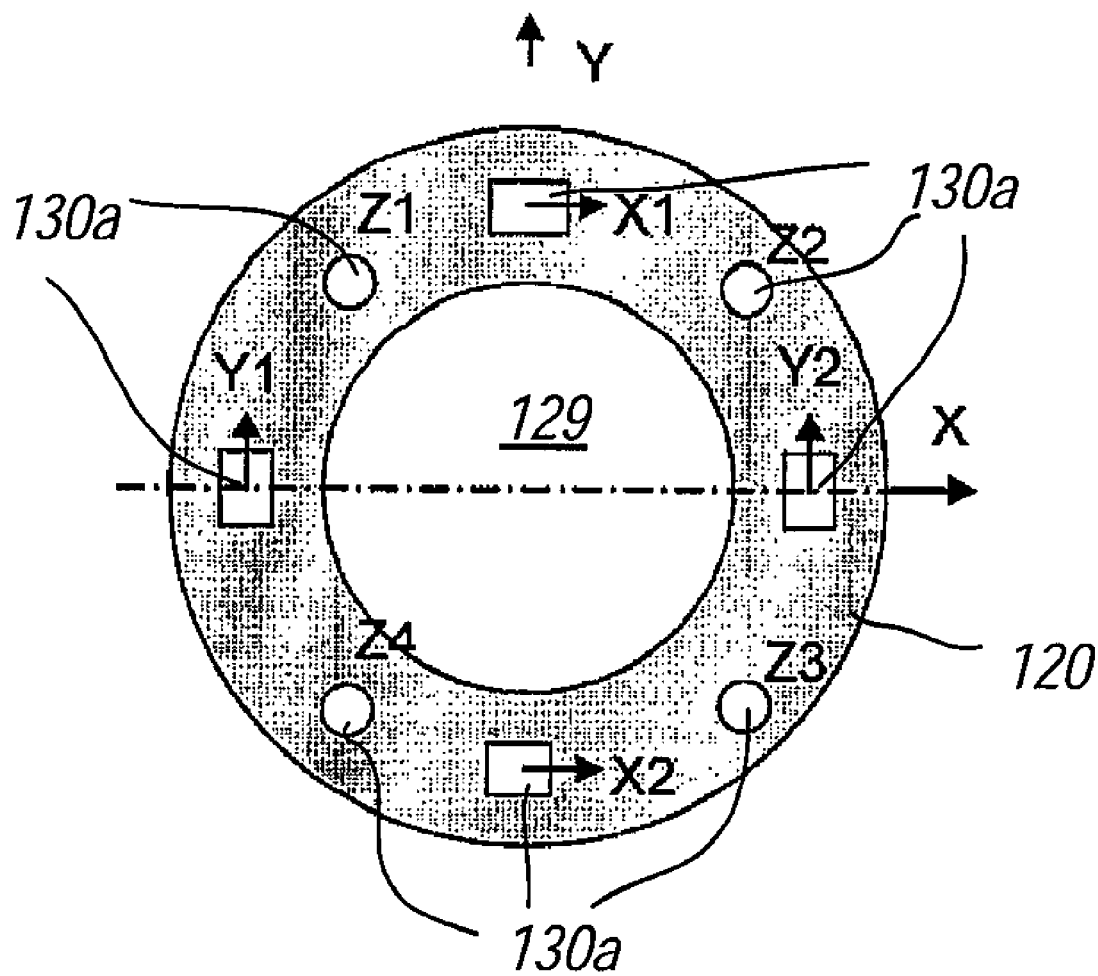
FIG. 9 is a cross sectional view along line A-A of FIG. 5 illustrating one possible geophone arrangement.

As such, using the geophone configuration shown in FIG. 9, the seismic signal received in the X and Y directions can be obtained by summing the values obtained by two of the geophones from opposite sides of the drill collar or module 120 as:

$$X = X1 + X2$$

$$Y = Y1 + Y2$$

Using the above summations allows for the rotational component of the seismic signal to be cancelled. Specifically, the rotational component can then be obtained by subtracting the values of geophones located on opposite side of the drill collar or module 120 from the others, such as:

$$R = (X1 - X2) + (Y1 - Y2)$$

The summation can be done either directly at the geophones 130a output or numerically after digitization. The vertical component can be obtained by summing the four vertical geophones 130b of FIG. 9 as:

$$Z = Z1 + Z2 + Z3 + Z4$$

The bending components are:

$$Zx = (Z2 - Z1) + (Z3 - Z4)$$

$$Zy = (Z1 - Z3) + (Z2 - Z4)$$

Figure 10:
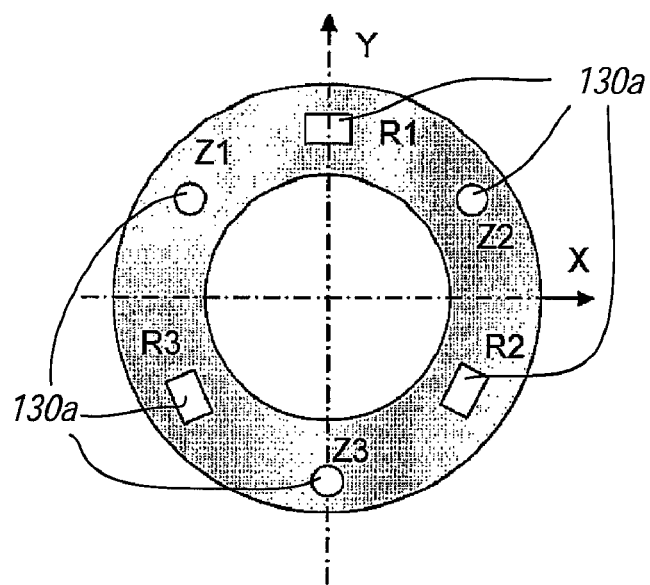
FIG. 10 is a cross sectional view along line A-A of FIG. 5 illustrating another possible geophone arrangement.

It is also possible to reduce the number of geophones and arrange them at every 120 degrees around the cylindrical tool as shown in FIG. 10. In this arrangement, $$X = R1 + (R2 - R3)\text{—horizontal component}$$

$$Y = R2 + R3\text{—horizontal component}$$

$$R = R1 + R2 + R3\text{—rotational component}$$

$$Z = Z1 + Z2 + Z3\text{—vertical component}$$

$$Zx = (Z2 - Z1)\text{—bending component}$$

$$Zy = c \times (Z1 + Z2) - Z3\text{—bending component}$$

Where c is a constant determined from the locations of the geophones.

Figure 11:
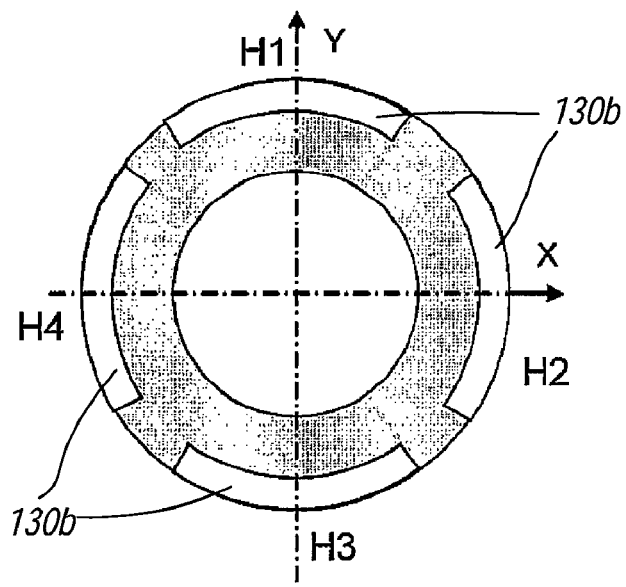
FIG. 11 is a cross sectional view along line B-B of FIG. 5 illustrating one possible hydrophone arrangement.

Furthermore, the cylindrical hydrophone can be segmented into four pieces as shown in FIG. 11 to form gradients. By subtracting it received signals, the direction of wave propagation may be determined.

The X component of a hydrophone signal is obtained by the pressure gradient as:

$$X = H2 - H4$$

The Y component is:

$$Y = H1 - H3$$

The pressure is then the sum of all hydrophones as:

$$P = H1 + H2 + H3 + H4$$

Clock Calibration

Figure 12:
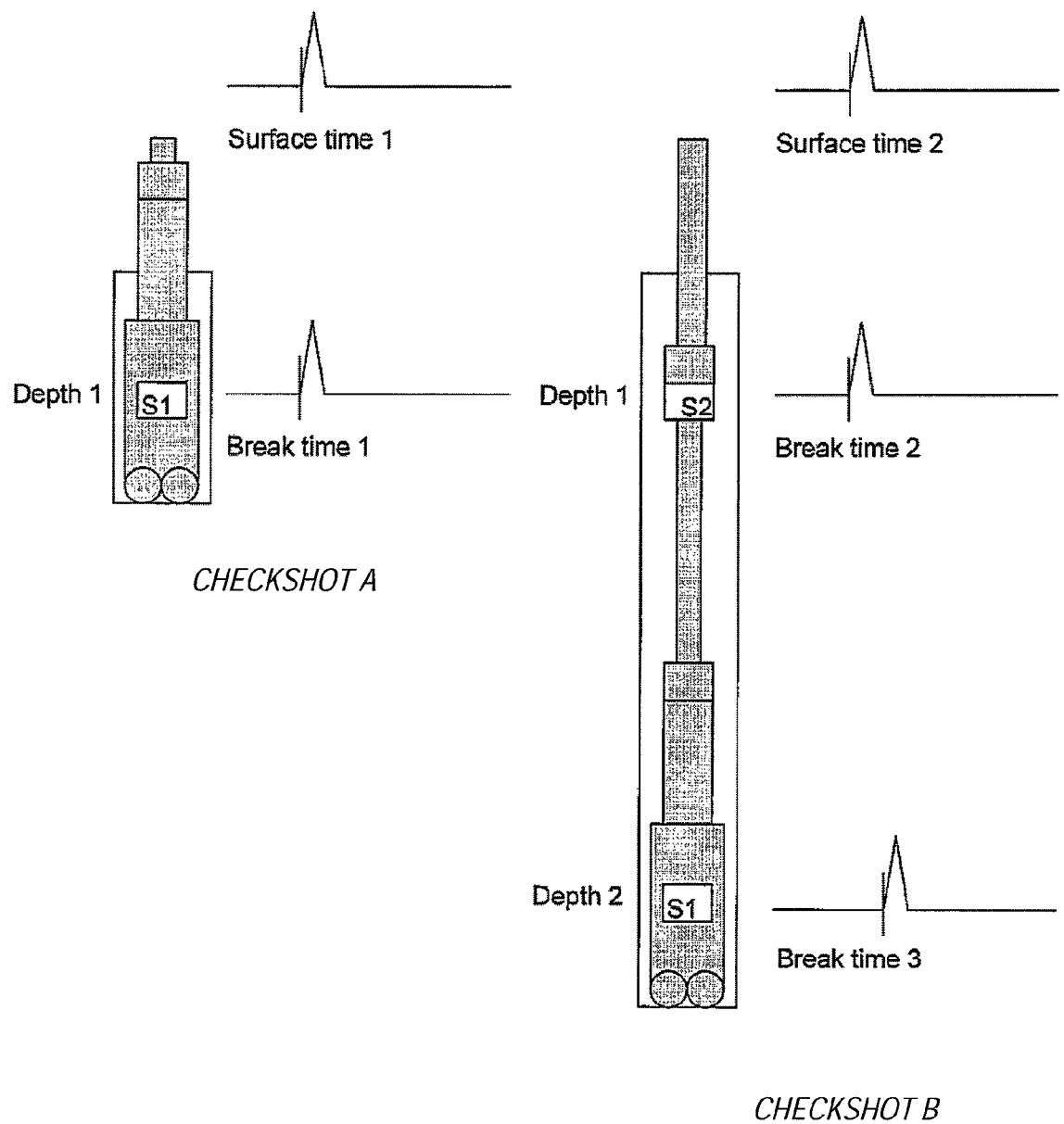
FIG. 12 is a side view of a drill string at two depths.

Referring again to FIG. 4, with the two or more seismic modules 120 or with the seismic array 310 of FIG. 4, clock calibration may be accomplished as is illustrated in FIG. 12. Specifically, when drilling is stopped at Depth 1, checkshot A is performed by activating the source 14 at the surface and receiving the source signal with sensor S1, as shown on the left in FIG. 12. The time at which the source is activated is the Surface time as measured with the surface or reference clock, and the time at which the signal is first received by the sensor S1 is the Break time as measured with the downhole clock. If another checkshot (B) is acquired at Depth 2 for sensor S1 (the depth of sensor S1 is at Depth 2), S2 acquires checkshot at Depth 1, which is now at the same depth at which S1 received the first checkshot. Checkshot A at Depth 1 with S1 should be the same as Checkshot B at Depth 1 with S2. If there is any difference between checkshot A and checkshot B, in the time it took for the signal to travel from the surface to the sensor (first S1 then S2) at Depth 1, then that difference is attributable to the drift in either the uphole or downhole clock or both.

Figure 13:
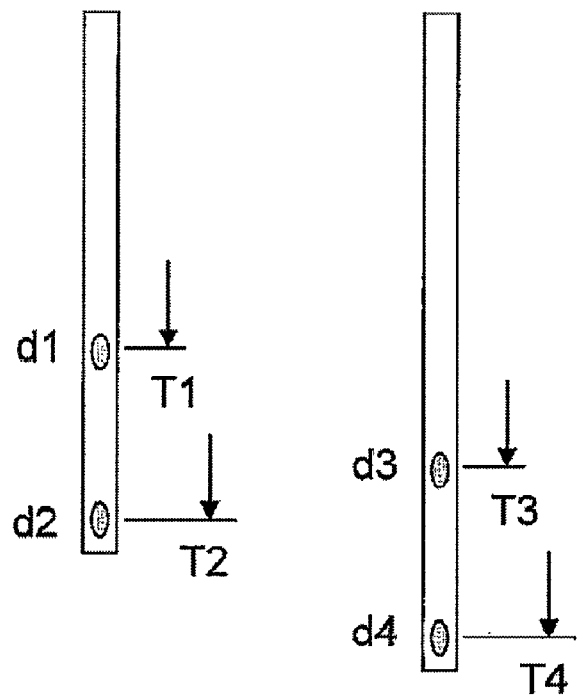
FIG. 13 is a side view of two checkshots at two different depths.

Practically speaking, however, it may not be possible to repeat checkshots at the same depth (as illustrated in FIG. 13) and there could be depth errors or differences between two checkshots, resulting in some overlap in the depth and data received. This can also be seen in the Time v. Depth graph of FIG. 14, which illustrates a line 350 from (d1, T1) to (d2, T2) and a line 352 from (d3, T3) to (d4, T4). By taking the slope of the line 350 and the slope of line 352, the velocity of the formation is obtained between those respective depths. Therefore, when placing the information of FIG. 13 into the graph of FIG. 14, it can be seen that the velocity determined at d3 (from line 352) is different from the interpolated velocity 354 at d3 from line 350.

Figure 14:
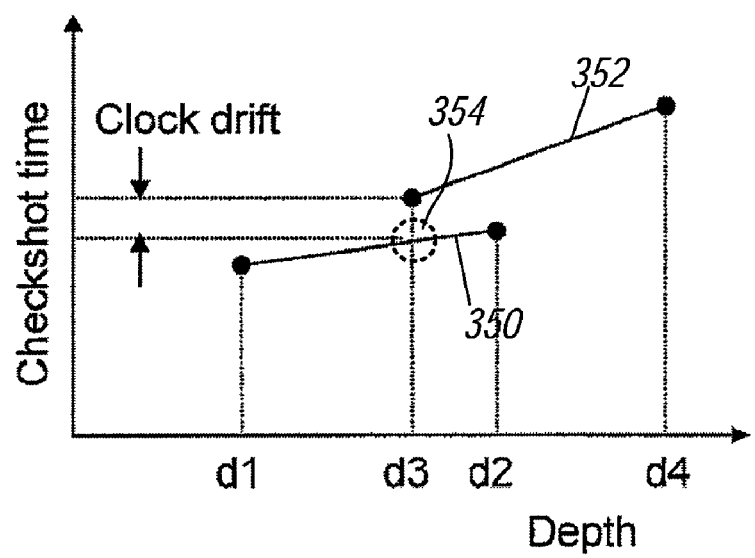
FIG. 14 is a Time v. Depth chart of the checkshots of FIG. 13.
Figure 15:
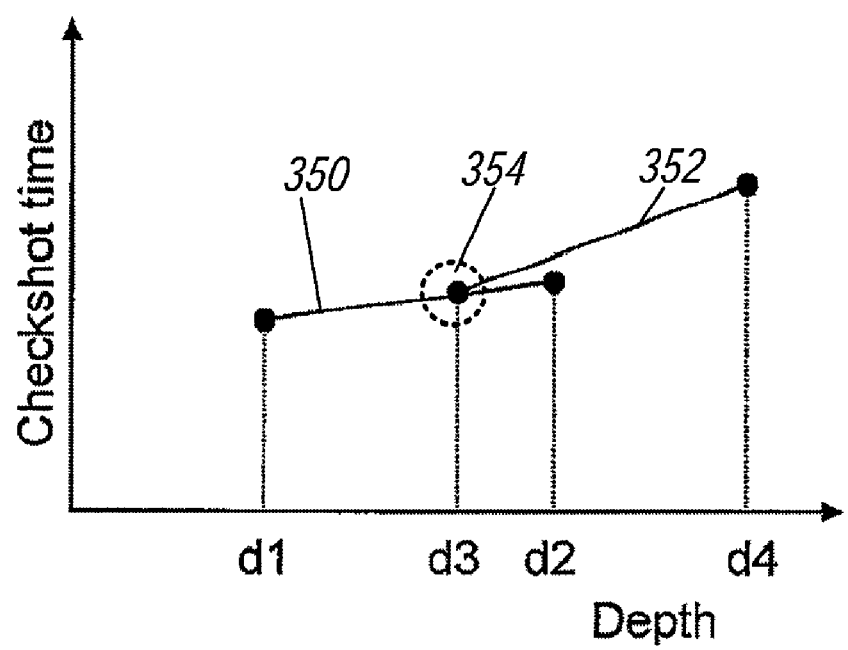
FIG. 15 is a Time v. Depth chart depicting drift of the clock by subtracted from the second checkshot time and calibrated checkshot time can be obtained.
Figure 16:
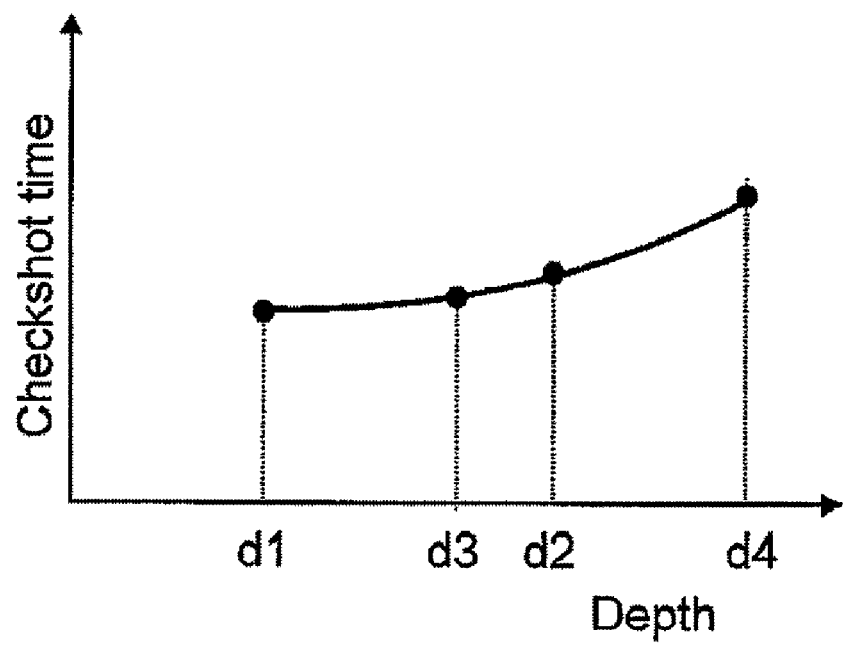
FIG. 16 is a Time v. Depth chart depicting drift determination by polynomial fitting.

Once again, this discrepancy is the drift of the clock or the difference in the uphole and downhole over time as they become desynchronized. One way of dealing with this drift is to subtract the time value corresponding to the drift from the second checkshot time or line 352, such that a calibrated checkshot time can be obtained, as shown in FIG. 15. In other words, by subtracting the drift of the clock, the velocity at d3 obtained with line 352 can be brought to the interpolated velocity at d3 obtained with line 350 at 354. Alternatively, the drift as shown in FIG. 14, may also be subtracted by a polynomial fitting resulting in the graph as shown in FIG. 16.

Specifically, the checkshot times at d3 and d4 are shifted to minimize least square errors in second order polynomial fitting.

Figure 17:
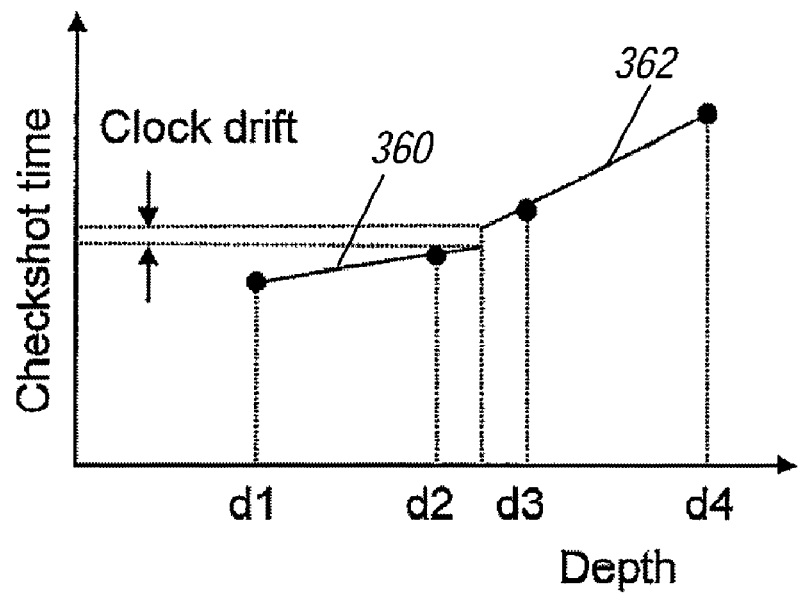
FIG. 17 is a Time v. Depth chart illustrating when a tool interval is less than a shot interval.
Figure 18:
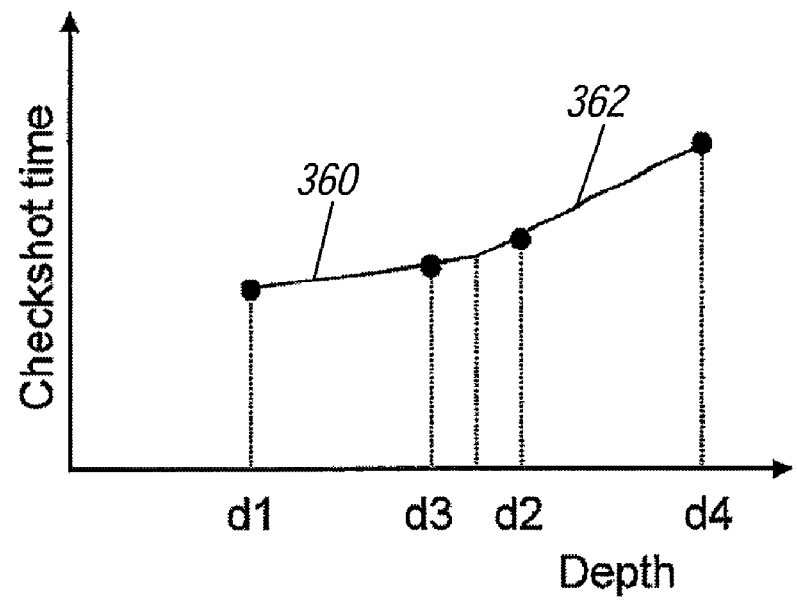
FIG. 18 is a Time v. Depth chart depicting that clock drift may be compensated by shifting later data to match the checkshot time at the extrapolated depth.

In another alternate embodiment, other techniques may be used to calibrate the clocks or compensate for the clock drift. For example, as shown in FIG. 17, when the second checkshot (d3, d4) is wholly beneath the first checkshot (d1, d2), such that there is no overlap in the respective velocities 362 and 360 as shown in FIG. 17, the clock drift appears in the extrapolation of the two consecutive checkshots. More specifically, by extrapolating the velocity 360 toward d3 and extrapolating the velocity 362 toward d2, a drift may be obtained by calculating the difference in the clock time at a point between d2 and d3, which in this case is located at (d2+d3)/2. The clock drift can then be compensated for by shifting the later data (362) to match the checkshot time at the extrapolated depth, as shown in FIG. 18.

Figure 19:
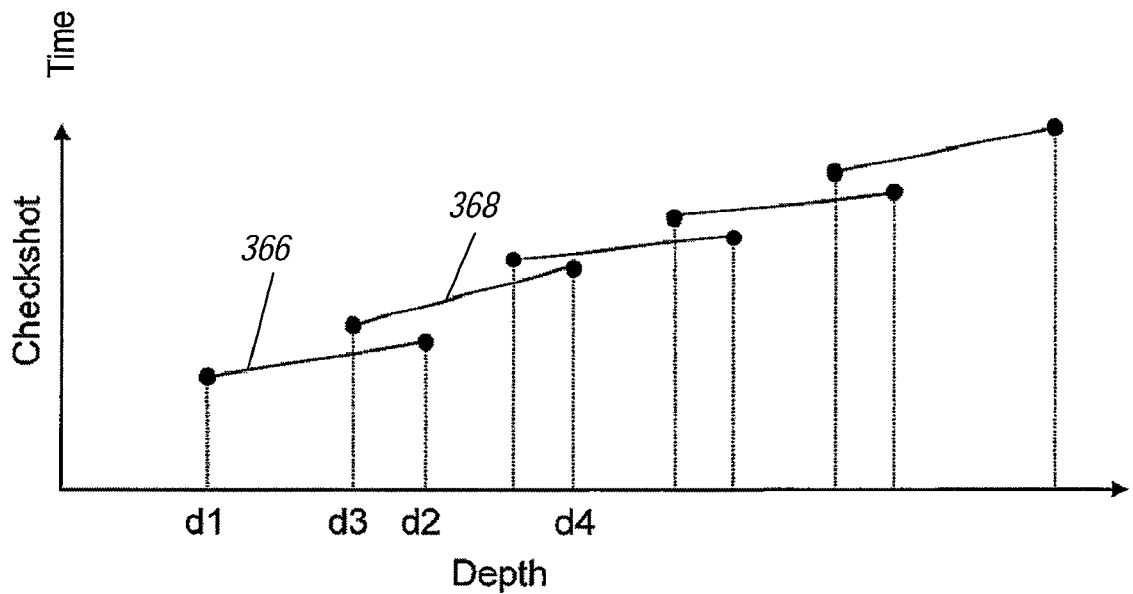
FIG. 19 is a Time v. Depth chart depicting an interval velocity in every checkshot that is determined by the downhole break time difference between two levels divided by the difference in the depths.

Thus, if the same seismic wave is detected by multiple levels or modules 120 at the same time, the velocity is still valid even if the downhole (uphole or both) clock drifts as long as the acquisition among multiple levels or modules 120 is synchronized. The interval velocity of the checkshots, which is the velocity between two modules 120 in this embodiment, may be determined by the downhole break time difference between two depths of the modules 120 divided by the difference in the depths, as shown in FIG. 19. In other words, by determining a slope of a line 366 between (d1, d2), a slope of a line 368 between (d3, d4), etc. the velocity of the formation disposed between those respective depth can be determined.

Figure 20:
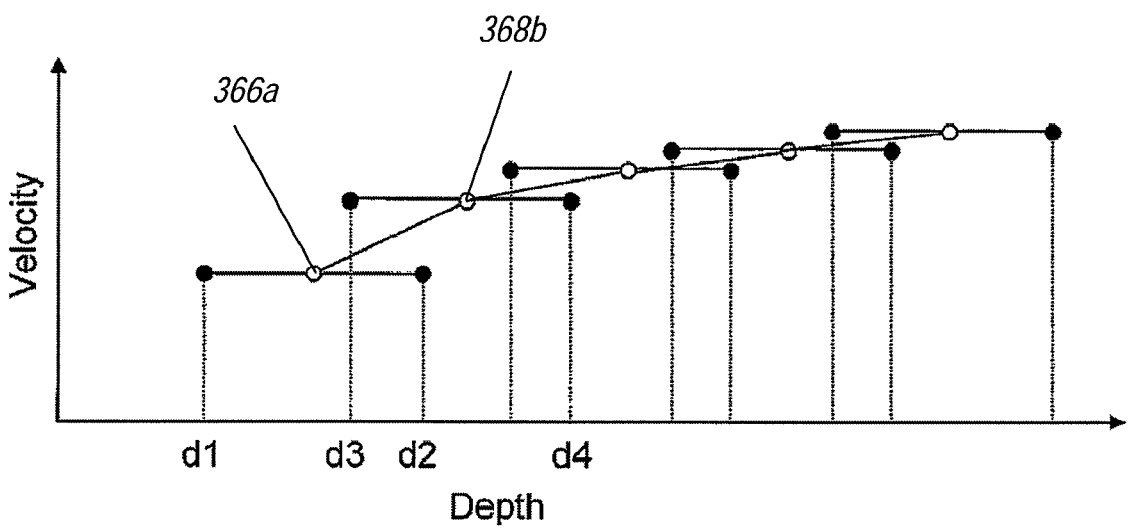
FIG. 20 is a Velocity v. Depth chart depicting an interval velocity that may be defined at the middle depth of two depths of acquisition.

This interval velocity may then be defined at a middle depth of two depths of acquisition, as shown in FIG. 20, and the velocity may be plotted against the depth. More specifically, the velocity between d1 and d2 may be determined by calculating the slope of line 366. Similarly, the velocity between d3 and d4 may be determined by calculating the slope of line 368. Before or after the velocity determination, the drift of the clock may also be compensated for using any of the previously mentioned or other methods. Regardless, once velocities 366a, 368b of lines 366, 368 have been determined, the velocities may be plotted along with their respective depths at which that velocity was determined in the velocity v. depth graph of FIG. 20.

Figure 21:
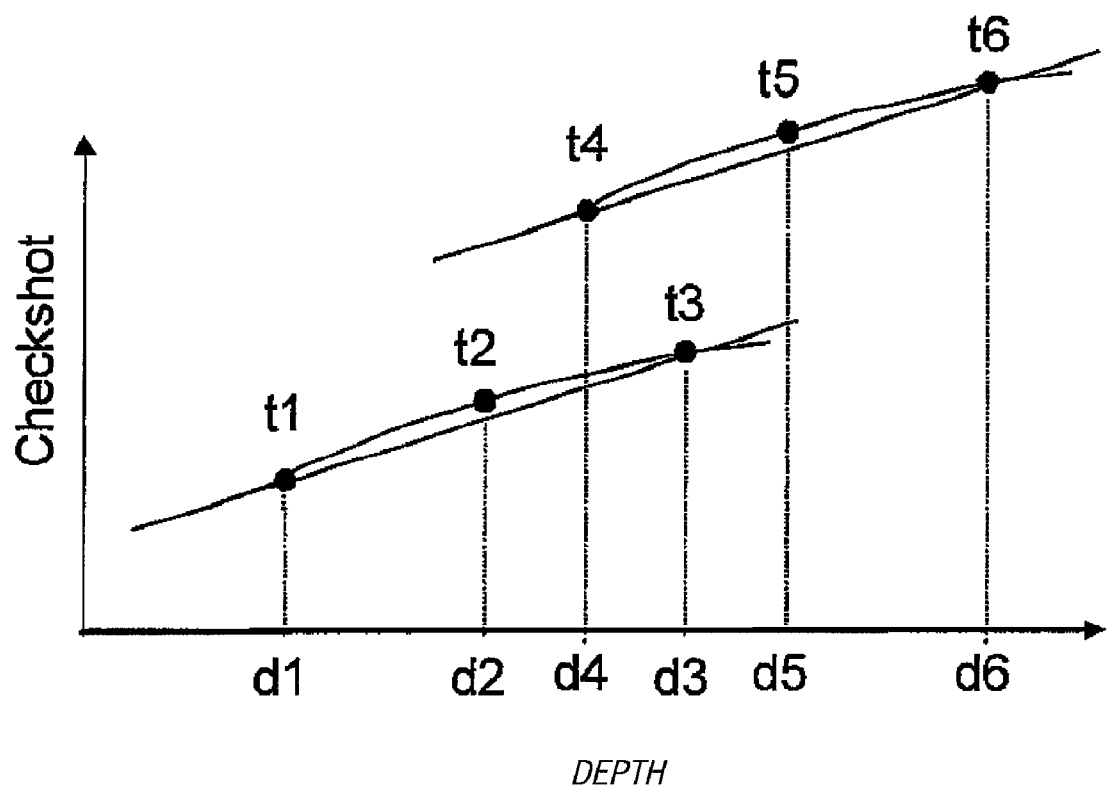
FIG. 21 is a Time v. Depth chart depicting an interval velocity using three modules.

The above description has been giving with the exemplary embodiment of using two modules 120 in the determination of the velocity and/or the drift of the clocks. However, it is contemplated herein that the array 310 may have three, four, or many more number of modules that would take part in the determination. For example, in a three module embodiment as shown in FIG. 21, the three modules may acquire a first shot t1, t2, and t3 at depths of d1, d2, and d3 respectably. Some time after, as the drilling progresses, the modules may acquire a second shot t4, t5, and t6 at d4, d5, and d6. Once again, drift of the clock(s) may occur. To overcome the drift, the first checkshot times may be expressed in a polynomial (a second order polynomial is used in this instance) as:

$$t = a_0 + a_1 d + a_2 d^2$$

From the fist shot, $$t_1 = a_0 + a_1 d_1 + a_2 d_1^2$$

$$t_2 = a_0 + a_1 d_2 + a_2 d_2^2$$

$$t_3 = a_0 + a_1 d_3 + a_2 d_3^2$$

Assuming that the distance between three tools are the same for simplicity sake, $$\Delta = d_2 - d_1 = d_3 - d$$

Then the coefficients, a0, a1, and a3 are found to be $$a_0 = t_2 - \frac{(t_3 - t_1)}{2\Delta} d_2 + \frac{(t_1 - 2t_2 + t_3)}{2\Delta^2} d_2^2$$

$$a_1 = \frac{(t_3 - t_1)}{2\Delta} - \frac{d_2(t_1 - 2t_2 + t_3)}{\Delta^2}$$

$$a_2 = \frac{(t_1 - 2t_2 + t_3)}{2\Delta^2}$$

The formation velocity is the gradient of the polynomial $$\frac{dt}{dd} = a_1 + 2a_2 d$$

The velocity at middle depth d2 is evaluated as $$\left.\frac{dt}{dd}\right|_{d=d_2} = \frac{t_3 - t_1}{2\Delta}$$

The result is the same as in case of two tools for the second order polynomial. The velocity is accurate, since downhole tools are synchronized; however, the clocks would be altered or desynchronized. Then shift the second shot data by Dt. Define the drift time Dt to optimize errors between the first and second checkshots.

For example, define d7 at middle of d3 and d4 and evaluate checkshot time t7 from the first shot by using the polynomial coefficients, a0, a1 and a2.

$$t_7 = a_0 + a_1 d_7 + a_2 d_7^2$$

In a similar fashion, the second shot can be expressed in another polynomial, $$t_7 - Dt = b_0 + b_1 d_7 + b_2 d_7^2$$

b0, b1, and b2 are coefficients found from the second shot and Dt is the drift. Then the drift Dt may be found as $$Dt = (a_0 + a_1 d_7 + a_2 d_7^2) - (b_0 + b_1 d_7 + b_2 d_7)$$

Figure 22:
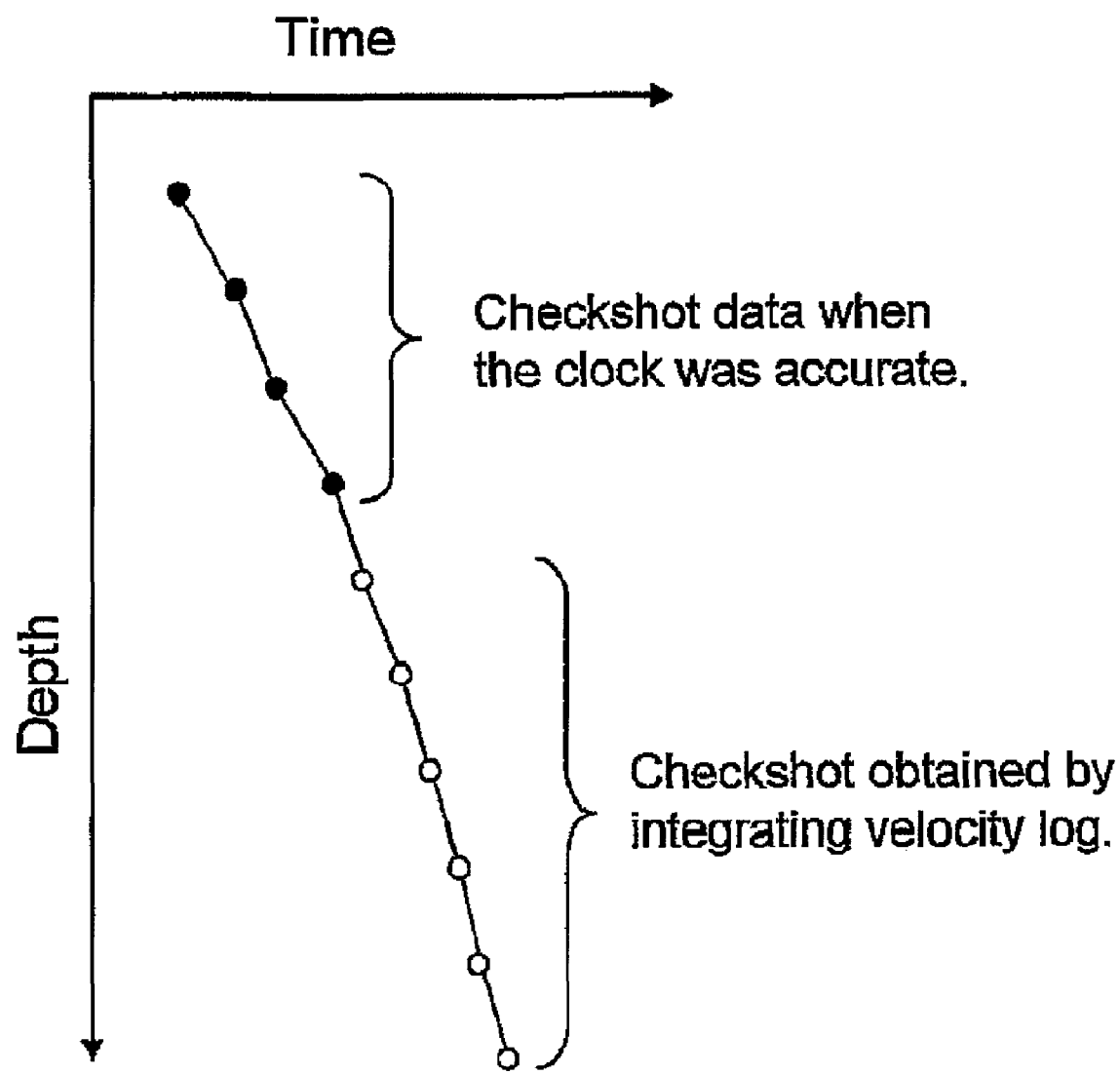
FIG. 22 is a Time v. Depth chart depicting a Time-Depth curve obtained by checkshot and an integrated velocity log.

In light of the above, regardless of the umber of modules that are present, it becomes possible to obtain an accurate velocity v. depth information and accurate time v. depth information, even if the clock has drift or are generally desynchronized. In one embodiment, by integrating and correlating the velocity log to data obtained when the clocks were still accurate or synchronized, accurate information can be obtained as illustrated in FIG. 22.

However, even if the clock drift can be calibrated and/or compensated for, it is still important to synchronize the multi-level seismic arrays relative to each other during a multi-level acquisition. This may be accomplished in several ways and will depend on the means by which the modules 120 are connected or communicate. For example, a seismic array 310 connected via WDP may use the inherent ability for the modules 120 to commutate with each other and/or with the BHA for example (FIG. 4). The modules 120 of the array 310, once again regardless of the connection means, do not require the ability of being able to communicate with the surface, as long as they can communicate or send information among themselves or to one another. Other means of communication between the modules 120 or from one module 120 to another or from one module 120 to the BHA contemplated herein, include, but are not limited to, drill-string waves, tube waves, downhole source such as the drillbit, mud pressure, and jars.

It will be understood from the foregoing description that various modifications and changes may be made in the preferred and alternative embodiments of the present invention without departing from its true spirit. In addition, this description is intended for purposes of illustration only and should not be construed in a limiting sense.

What is claimed is:

1. A method of obtaining formation parameters using a seismic tool array, comprising:
receiving seismic waves with a plurality of seismic modules, wherein a first and a second module of the plurality of modules are disposed on a drill string and are separated by at least one section of drill pipe;
determining a parameter of the formation by using the seismic wave information received by the first and the second modules;
actuating a first checkshot when the first module is at a first depth;
synchronizing an uphole clock with a downhole clock associated with the first module;
actuating a second checkshot when the second module is near the first depth; and
compensating for drift among the uphole clock and the downhole clock using seismic wave information received by the first and second modules at the first depth.

2. The method of claim 1, wherein compensating for drift further includes synchronizing the seismic wave information received by the first and the second modules.

3. The method of claim 2, further including, maintaining drift compensation among the uphole clock and the downhole clock by using seismic wave information obtained by the first and second modules at subsequent substantially common depths.

4. The method of claim 1, further including drilling a borehole with a drill string that includes the seismic tool array.

5. The method of claim 1, further including obtaining seismic wave information with the first and the second modules at a second depth.

6. The method of claim 5, further including obtaining a velocity of the formation between the first and second modules at the first depth and a velocity of the formation between the first and second modules at the second depth.

7. The method of claim 6, further including determining a time versus depth of the formation utilizing the obtained velocities.

8. The method of claim 1 wherein the at least one section of pipe includes a plurality of pipes having a length of approximately 10 meters.

9. The method of claim 1, wherein the at least one section of drill pipe comprises a plurality of drill pipe.

10. The method of claim 9, wherein the plurality of drill pipe comprises three drill pipes.

11. The method of claim 1, wherein the at least one section of drill pipe comprises at least one drill pipe approximately 10 m in length.

12. The method of claim 1, further comprising providing a telemetry system between the first and second modules.

13. A method of obtaining formation parameters using a seismic tool array, comprising:
providing a seismic tool array having a least a reference clock and a downhole clock;
propagating a first set of seismic waves into a subterranean formation at a first time, wherein the clocks are synchronized;
receiving the first set of seismic waves with a plurality of seismic modules, wherein a first and a second of the plurality of modules are disposed on a drill string and are separated by at least one section of drill pipe;
propagating a second set of seismic waves into the subterranean formation at a second time, wherein the clocks are desynchronized;
receiving the second set of seismic waves with the plurality of seismic modules; and
determining a velocity of the formation by using a difference in the seismic waves received by a first and a second module of the plurality of seismic modules at the first and second times.

14. The method of claim 13 wherein the plurality of modules are disposed at a first depth during the first time and a second depth during the second time, the first depth being different from the second depth.

15. The method of claim 13 wherein the first module is at a first depth and the second module is at a second depth at the first time, and the first module is at a third depth and the second module is at a fourth depth at the second time, the first depth being the deepest.

16. A method of obtaining formation parameters using a seismic tool array, comprising:
receiving seismic waves with a plurality of seismic modules, wherein a first and a second of the plurality of modules are disposed on a drill string and are separated by at least one section of drill pipe;
controlling drift between an uphole clock and a downhole clock by determining a difference between the seismic waves received by the first module and the seismic waves received by the second module at a common depth.

17. A method of obtaining formation parameters using a seismic tool array, comprising:
disposing a first seismic module and a second seismic module on a drill string separated by at least one section of drill pipe;
receiving a first set of seismic waves with the first and second seismic modules when the drill string is at a first depth;
receiving a second set of seismic waves with the first and second seismic modules when the drill string is at a second depth;
obtaining a first velocity of the formation between the first and second modules at the first depth and a second velocity of the formation between the first and second modules at the second depth.

18. The method according to claim 17, further comprising correcting for drift among an uphole clock and a downhole clock by extrapolating the first and second velocities to a common depth location value when there is no overlap between locations of depths defined by the first and second seismic modules at the first and second depths.

19. The method according to claim 17, further comprising correcting for drift among an uphole clock and a downhole clock by determining the difference at a common depth location value between a velocity value of the second seismic module at the second depth and an interpolated velocity value between velocity values of the first and second seismic modules at the first depth, when there is an overlap between locations of depths defined by the first and second seismic modules at the first and second depths.

20. The method according to claim 17, wherein the at least one section of drill pipe comprises at least one drill pipe approximately 10 m in length.

* * * * *